Aug. 29, 1944.  R. B. STANDEFER  2,357,145
FULL HOLE CEMENTING DEVICE
Filed Jan. 15, 1943  2 Sheets-Sheet 1
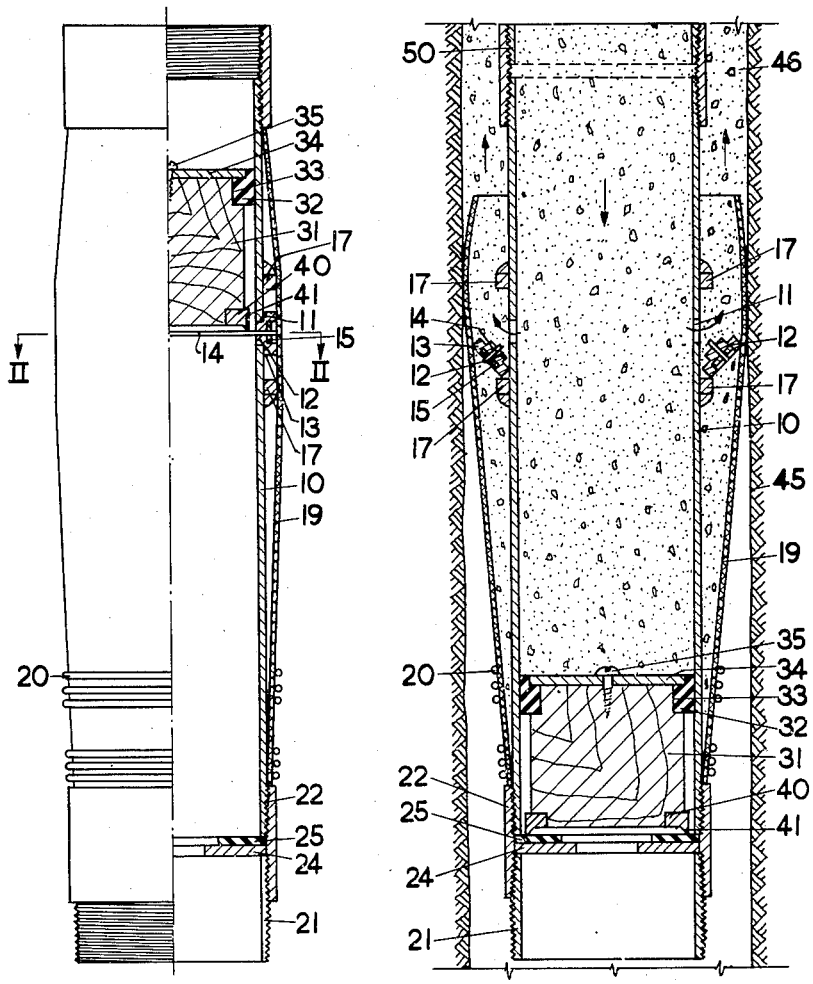
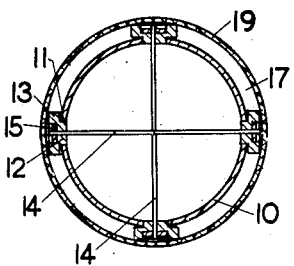
Inventor: Rufus B. Standefer
By his Attorney:

Aug. 29, 1944.   R. B. STANDEFER   2,357,145
FULL HOLE CEMENTING DEVICE
Filed Jan. 15, 1943   2 Sheets-Sheet 2
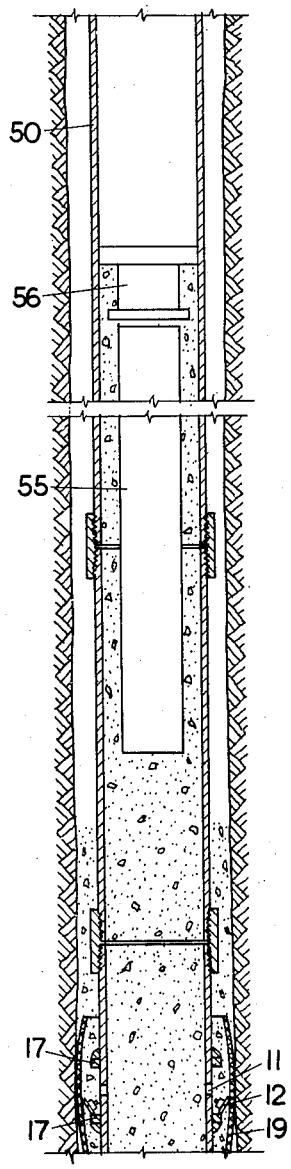
Fig. IV
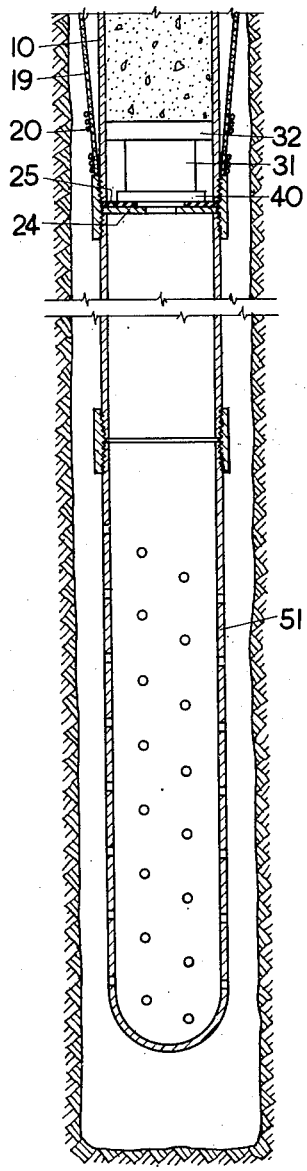
Fig. V
Inventor: Rufus B. Standefer
By his Attorney:

Patented Aug. 29, 1944

2,357,145

UNITED STATES PATENT OFFICE 2,357,145

FULL HOLE CEMENTING DEVICE

Rufus B. Standefer, Mene Grande, Venezuela, assignor to Shell Development Company, San Francisco, Calif., a corporation of Delaware Application January 15, 1943, Serial No. 472,529

1 Claim. (Cl. 166—1)

This invention relates to the art of cementing oil wells and pertains more particularly to an improved and novel apparatus for full hole cementing of oil wells.

Full hole cementing is applicable in wells completed with screens or perforated liners and comprises the steps of drilling a full size borehole into the producing stratum, lowering into the well a "combination string" of casing having attached at its lower end a screen or perforated liner of the same size as the casing, circulating out the detritus outside the screen, and then cementing in the casing above the screen. This method of completing wells is highly desirable, in that it can be carried out in one continuous operation, is thereby faster, and allows the use of a larger screen or liner with larger drainage area than by other completion methods.

The full hole cementing method utilizes a valved port above the screen through which the cement is ejected to the annular space outside the casing string. However, the valves heretofore proposed have certain disadvantages in that some of them tend to open prematurely and permit the drilling fluid in the casing below the charge of cement to be ejected through the cementing ports ahead of the cement whereby the cement on being subsequently ejected through the ports becomes contaminated and mixes with the drilling fluid, resulting in a cement plug of low strength and in poor sealing contact with the borehole walls. Other devices are so complicated that they often do not operate properly, resulting in difficult fishing operations or poor cementing jobs.

It is therefore an object of this invention to provide a cementing device in which the cementing ports only can open when the bottom plug, which separates the charge of cement from the fluid below it, is adjacent the cementing ports.

It is another object of this invention to provide a simple, efficient and novel full hole cementing device.

With the above and other objects in view, the invention has particular relation to certain novel features of construction, operation and arrangement of parts, an example of which is given in this specification and illustrated by the accompanying drawings, wherein:

Figure I is a vertical view of the present cementing device, showing the bottom plug in position immediately before the cementing ports are opened, in which figure the right-hand side is shown in section and the left-hand side in elevation.

Figure II is a cross-sectional view taken along the line II—II of Figure I.

Figure III is a vertical sectional view of the cementing device, showing the cementing ports in open position and the bottom plug in its lower sealing position.

Figure IV is a vertical sectional view of a well, showing the upper portion of the cementing device in operation in the well.

Figure V is a continuation of Figure IV, showing the lower portion of the cementing device together with a perforated liner.

Referring to the drawings, the cementing apparatus of the present invention comprises a tubular member 10 externally threaded at each end and having lateral cementing ports 11 preferably arranged, as shown in Figure II, in opposed position and normally closed by plugs 12, preferably of steel. The plugs 12 are conveniently formed with a flange 13, although they may be tapered, and are adapted to be inserted into the ports 11 from the outside of the tubular member 10. A suitable packing of rubber, fiber or the like may be provided between the flange 13 and the tubular member 10 to act as a seal. The plugs 12 are held in place in the ports by frangible means, such as rods 14 of soft metal, for example, brass, which extend through the plugs 12 and bolted thereto by nuts 15 screwed on the outer ends of the rods 14. To protect the plugs 12 from damage during the lowering of the casing into the well, suitable rings 17 of steel or the like are attached, for example, by welding, to the outside of the tubular member 10 a short distance above and below the ports 11.

Surrounding the tubular member and preferably extending from the upper to lower end is a sleeve 19 of flexible material, such as canvas, rubberized canvas or other fabric, rubber, etc., which sleeve may first serve as a packer and later serve as a cement basket. The lower end of the sleeve 19 is securely attached to the tubular member 10 by means such as wire 20 or other type wrappings, while the upper end of the sleeve 19 is attached to the tubular member 10 in a manner later adapted to be broken by pressure applied within the sleeve 19 through the ports 11, e. g. a few turns of twine, wire, or the like.

Held between the lower end of the tubular member 10 and another externally threaded tubular member 21 of the same diameter, which are connected together by a coupling 22, are a perforated baffle plate 24 and an annular packer 25, arranged with the latter in uppermost position, as shown in Figure III. If desired, however, as shown in Figure V, the baffle plate 24 may be welded or otherwise suitably attached within the lower position of the tubular member 10, and the annular packer 25 may rest on the baffle plate 24, whereby the second tubular member 21 may be eliminated.

The bottom plug 31 which is inserted into the casing directly before the charge of cement to separate the cement from the fluid standing in the casing string, may be formed of the usual wooden body, or of any other suitable material. A suitable packer, such as a ring 32 of rubber, rubberized canvas, etc., is carried by the upper end of the plug 31 and is adapted to form a seal with the casing walls. As shown in Figure III, the packer ring 32 may be fitted about the constricted upper end 33 of the plug body 31 and held thereon by a plate or disc 34 fastened by a screw 35 to the plug body 31. Shearing means are carried by the lower end of the plug 31 and may comprise a cast-iron ring 40 having a knife edge 41 adapted to cut the frangible means, such as rods 14, connecting and holding in place the steel plugs 12.

In operation, the tubular member 10 having its ports 11 closed by the steel plugs 12 is inserted into the casing string 50 at the desired distance above the screen or perforated liner 51 (Figure V) and this "combination string," as it is called, is lowered into the well borehole to its desired position. The detritus, including cavings, cuttings, and heavy muck, behind the screen is removed from the well by circulation of fluid, such as water, for example, in a path down through the casing string 50 and out through the liner screen 51 and back to the surface through the annular space between the casing string and the borehole walls.

When the charge of cement has been properly mixed and prepared, the bottom separating plug 31 is inserted into the casing and the charge of cement introduced into the casing on top of the plug 31 as is well known in the art. As shown in Figure IV, the charge of cement may be followed by a suitable spacer plug 55 and top sealing plug 56 which may be similar to the bottom plug 31 without the shearing means attached thereto.

The charge of cement with bottom plug 31 below it is then forced down through the casing string by applying pressure thereabove, such as means of an overload of drilling fluid, water, oil, etc., pumped into the casing on top of the top plug 56 or charge of cement. When the bottom plug 31 contacts the connecting rods 14 as shown in Figure I, this is indicated by an increase of the back pressure on the drilling fluid pump at the surface. This pressure is then further increased, causing the bottom plug to be forced downward to cut the connecting rods 14 and to release the steel plugs 12. The bottom plug 31 continues down through the tubular member 10 and comes to rest with the knife edge embedded in the packer ring 25 on the baffle plate 24, whereby a good seal is effected, preventing passage of cement on down through the tubular member 10, which would result in plugging the screen below said member.

The pressure of the charge of cement against the inside of the steel plugs 12 forces them out of the ports 11, whereupon the cement is discharged into the inside of the canvas sleeve 19. The pressure of the cement therein causes the connection between the sleeve and the upper portion of the tubular member 10 to be broken, whereby the sleeve expands against the borehole walls 45 and forms a cement basket preventing the cement from passing downward in the annular space 46 between the tubular member 10 and the borehole walls, as shown in Figure III, which would likewise result in plugging the screen.

The charge of cement upon being further discharged through the ports 11 flows upwards in the annular space 46 and the pressure within the casing string and tubular member 10 is maintained until substantially all the cement has been so discharged. When using the usual spacer plug 55 and top cementing plug 56, as shown in Figures IV and V, the continued application of pressure is stopped, as is well known in the art, an increase in back pressure on the drilling fluid or mud pump indicates that the spacer plug 55 and top plug 56 come to rest on the bottom plug 31. The spacer plug 55, being of somewhat smaller diameter than the tubular member 10, allows a sleeve of cement to remain within the tubular member 10, thereby insuring a good seal. The top, spacer and bottom plugs are then drilled out and the well produced in the normal manner.

It will be seen that the present invention provides several novel features of construction and advantages, one of which resides in the fact that the cementing ports cannot be opened prematurely, and open only when the bottom cementing plug 31 with the charge of cement directly above it reaches the ports 11 and the sealing means in the ports 11 are released by the action of the bottom plug 31.

Although the present invention has been illustrated by one particular embodiment, it will be apparent that various modifications can be made without departing from the scope of the invention as defined by the appended claim.

I claim as my invention:

Apparatus for use in the cementing of a casing string in a well, which casing string carries screening means at its lower end, including in combination with the casing string, a tubular member made up with the casing string above the screening means, lateral ports in said tubular member, plugs inserted into the ports from the outside of the tubular member and normally closing said ports, frangible means traversing the bore of said tubular member and connecting the several plugs for holding said plugs in closing position on said ports, annular stop means within said tubular member substantially below said ports, a flexible sleeve surrounding said tubular member and having its lower end securely fastened to said tubular member below said ports and its upper end releasably attached thereto above said ports, and a plug member adapted to be inserted into the casing string directly below the charge of cement and to be pumped down through the casing string and into the tubular member together with the charge of cement, said plug member having means for forming a seal with walls of the casing string and having shearing means on its lower end for cutting said frangible means holding the plugs in place in the lateral ports, whereby when the plug member and the cement is forced down into the tubular member by fluid pressure applied thereabove, the ports are opened, the plug member comes to rest on the annular stop means and the cement is ejected through the ports into the sleeve, causing its upper connection to break and to allow the sleeve to be expanded against the borehole walls for preventing flow of cement downwards outside the tubular member.

RUFUS B. STANDEFER.